United States Patent
Khawaja et al.

(10) Patent No.: US 11,537,914 B2
(45) Date of Patent: Dec. 27, 2022

(54) SYSTEMS AND METHODS FOR DETERMINING DEVELOPED CODE SCORES OF AN APPLICATION

(71) Applicant: Capital One Services, LLC, McLean, VA (US)

(72) Inventors: Ateeb Khawaja, Chicago, IL (US); Eric K. Barnum, Midlothian, VA (US)

(73) Assignee: Capital One Services, LLC, McLean, VA (US)

(*) Notice: Subject to any disclaimer, the term of this patent is extended or adjusted under 35 U.S.C. 154(b) by 338 days.

(21) Appl. No.: 16/871,172

(22) Filed: May 11, 2020

(65) Prior Publication Data
US 2021/0350255 A1    Nov. 11, 2021

(51) Int. Cl.
*G06N 5/04* (2006.01)
*G06N 20/00* (2019.01)

(52) U.S. Cl.
CPC ............ *G06N 5/04* (2013.01); *G06N 20/00* (2019.01)

(58) Field of Classification Search
CPC ........ G06N 20/00; G06N 3/084; G06N 7/005; G06N 5/046; G06N 5/003; G06N 5/02; G06N 20/20; G06N 20/10; G06N 3/0454; G06N 5/04; G06N 3/0445; G06N 3/08; G06F 21/563; G06F 11/362; G06F 17/18; G06F 11/3409; G06F 2221/033; G06F 11/36; G06F 11/008; G06F 21/577; G06F 11/3664; G06F 11/3604; G06F 8/77
See application file for complete search history.

(56) References Cited

U.S. PATENT DOCUMENTS

| | | | | |
|---|---|---|---|---|
| 7,412,430 | B1* | 8/2008 | Moore | G06F 11/3604 706/9 |
| 8,707,262 | B2* | 4/2014 | Eska | G06Q 10/06 717/123 |
| 8,756,576 | B2* | 6/2014 | Balasubramanian | G06F 11/3664 717/124 |
| 8,856,725 | B1* | 10/2014 | Anderson | G06F 8/75 717/103 |
| 9,417,867 | B2* | 8/2016 | Abuelsaad | G06F 8/72 |
| 9,727,736 | B1* | 8/2017 | McClintock | G06F 8/71 |
| 10,055,335 | B2* | 8/2018 | Chau | G06F 40/143 |

(Continued)

OTHER PUBLICATIONS

Tripathi, Manish K. et al., Prediction of Quality of Service Parameters Using Aggregate Software Metrics and Machine Learning Techniques, IEEE, 2018 (Year: 2018).*

(Continued)

*Primary Examiner* — Scott L Jarrett
(74) *Attorney, Agent, or Firm* — Bookoff McAndrews, PLLC (57) ABSTRACT

Disclosed are systems and methods for determining developed code scores of an application. The method may include: receiving, by a processor, one or more first score tags of one or more first blocks of developed code from a user through a computing device; identifying, by the processor, patterns in the developed code based on the received one or more first score tags; applying, by the processor, the identified patterns to one or more second blocks of the developed code; and determining, by the processor, one or more second score tags for the one or more second blocks of the developed code based on the applied patterns.

20 Claims, 5 Drawing Sheets

(56) References Cited

U.S. PATENT DOCUMENTS

| | | | |
|---|---|---|---|
| 10,089,463 B1* | 10/2018 | Katz | G06F 21/50 |
| 10,257,331 B2 | 4/2019 | Gudka et al. | |
| 10,579,509 B2* | 3/2020 | Banuelos | G06F 11/3664 |
| 10,810,106 B1* | 10/2020 | Amit | G06F 11/3604 |
| 10,949,338 B1* | 3/2021 | Sirianni | G06N 20/20 |
| 11,144,429 B2* | 10/2021 | Chakra | G06K 9/6256 |
| 11,169,786 B2* | 11/2021 | Badlani | G06F 8/77 |
| 11,223,546 B2* | 1/2022 | Schibler | H04L 41/082 |
| 2005/0223354 A1* | 10/2005 | Drissi | G06F 8/36 717/114 |
| 2007/0168946 A1* | 7/2007 | Drissi | G06F 8/36 717/110 |
| 2009/0217246 A1* | 8/2009 | Kondur | G06Q 30/02 717/126 |
| 2014/0215614 A1* | 7/2014 | Beskrovny | G06F 21/51 726/23 |
| 2015/0332184 A1* | 11/2015 | Osborn | G06Q 10/00 705/7.28 |
| 2016/0034838 A1 | 2/2016 | Gembicki | |
| 2016/0224453 A1* | 8/2016 | Wang | G06F 8/71 |
| 2016/0253684 A1* | 9/2016 | Ning | G06Q 30/0201 705/7.29 |
| 2017/0293546 A1* | 10/2017 | Frontiero | G06F 11/302 |
| 2019/0050319 A1* | 2/2019 | Gondalia | G06F 11/3664 |
| 2019/0220253 A1* | 7/2019 | Pradhan | G06N 3/08 |
| 2019/0287029 A1* | 9/2019 | Sobran | G06F 11/362 |
| 2019/0312800 A1* | 10/2019 | Schibler | H04L 41/0823 |
| 2019/0317760 A1* | 10/2019 | Kessentini | G06F 8/65 |
| 2019/0340095 A1* | 11/2019 | Faibish | G06F 11/302 |
| 2020/0133830 A1* | 4/2020 | Sharma | G06F 11/3676 |
| 2020/0174774 A1* | 6/2020 | Natarajan | G06F 8/65 |
| 2020/0218533 A1* | 7/2020 | Sharma | G06F 8/77 |
| 2021/0011695 A1* | 1/2021 | Machacek | G06N 3/084 |
| 2021/0027205 A1* | 1/2021 | Sevakula | G06N 3/0445 |
| 2021/0216939 A1* | 7/2021 | Digrazia | G06Q 10/06393 |
| 2021/0224064 A1* | 7/2021 | Hicks | G06Q 10/063112 |
| 2021/0240453 A1* | 8/2021 | Badlani | G06F 8/73 |
| 2021/0342146 A1* | 11/2021 | Ignatyev | G06F 8/77 |
| 2021/0349713 A1* | 11/2021 | Khawaja | G06F 11/302 |
| 2021/0350255 A1* | 11/2021 | Khawaja | G06N 5/04 |
| 2021/0406004 A1* | 12/2021 | Ray | G06F 8/75 |

OTHER PUBLICATIONS

Sultana, Kazi Zakia, Towards a Software Vulnerability Prediction Model using Traceable Code Patterns and Software Metrics IEEE, ASE2017, 2017 (Year: 2017).*

Uchiyama, Satoru et al., Design Pattern Detection Using Software Metrics and Machine Learning Joint Proceedings of MDSM 2011, 2011 (Year: 2011).*

Tsantalis, Nikolaos et al., Design Pattern Detection Using Similarity Scoring IEEE Transactions of Software Engineering, vol. 32, No. 11, Nov. 2006 (Year: 2006).*

Mhawish, Mohammad Y. et al., Software Metrics and tree-based machine learning algorithms for distinguishing and detecting similar design patters, SN Applied Sciences, vol. 2, No. 11, 2020 (Year: 2020).*

Reddivari, Sandeep et al., Software Quality Prediction: An Investigation based on Machine Learning 2019 IEEE 20th International Conference on Information Reuse and Integration of Data Science, 2019 (Year: 2019).*

Cowlessur, Sanjeev K. et al., A Review of Machine Learning Techniques for Software Quality Prediction Advanced Computing and Intelligent Engineering, Advances in Intelligent Systems and Computing, Springer Nature, 2020 (Year: 2020).*

Al-Jamimi, Hamid A. et al., Machine Learning-based Software Quality Prediction Models: State of the Art Proc. Int. Conf. Inf. Sci. Appl. (ICISA), Jun. 2013 (Year: 2013).*

Canaparo, Marco et al., Data Mining Techniques for Software Quality Prediction in Open Source Software EPJ Web Conferences, 214, CHEP 2018 (Year: 2018).*

Rawat, Mrinal Singh et al., Software Defect Prediction Models for Quality Improvement: A Literature Study IJCSI International Journal of Computer Sciences, vol. 9, No. 2, Sep. 2012 (Year: 2012).*

* cited by examiner

SYSTEMS AND METHODS FOR DETERMINING DEVELOPED CODE SCORES OF AN APPLICATION

TECHNICAL FIELD

Various embodiments of the present disclosure relate generally to application reliability, resiliency, performance, security, and, more particularly, to systems and methods for determining developed code scores of an application.

BACKGROUND

Application reliability, resiliency, performance, security, and the like are critical metrics in developing and maintaining business processes. For example, site reliability engineering (SRE) can drive overall service availability, impact outages, affect how the business reacts to outages, and affect how service level objectives (SLOs) are adjusted based on outages and/or incidents. Further, it is important to develop applications based on performance and security metrics for a particular business and/or objectives of the application. Currently, determining reliability, resiliency, performance, security, or other metrics of an application are manual processes determined by software engineers and/or developer engineers and include subjective metrics. Further, the metrics used by the engineers may differ across various businesses.

The systems and methods of the present disclosure may solve one or more of the problems set forth above and/or other problems in the art. The scope of the current disclosure, however, is not defined by the attached claims, and not by the ability to solve any specific problem. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, systems and methods are disclosed for determining developed code scores of an application. Each of the examples disclosed herein may include one or more of the features described in connection with any of the other disclosed examples.

In one embodiment, a computer-implemented method for determining developed code scores of an application is disclosed. The method may include: receiving, by a processor, one or more first score tags of one or more first blocks of developed code from a user through a computing device; identifying, by the processor, patterns in the developed code based on the received one or more first score tags; applying, by the processor, the identified patterns to one or more second blocks of the developed code; and determining, by the processor, one or more second score tags for the one or more second blocks of the developed code based on the applied patterns.

In another embodiment, a computer system for determining developed code scores of an application is disclosed. The computer system may include: a memory having processor-readable instructions stored therein; and at least one processor configured to access the memory and execute the processor-readable instructions, which when executed by the processor configures the processor to perform a plurality of functions, including functions for: receiving one or more first score tags of one or more first blocks of developed code from a user through a computing device; identifying patterns in the developed code based on the received first score tags; applying the identified patterns to one or more second blocks of the developed code; and determining second score tags for the one or more second blocks of the developed code based on the applied patterns.

In yet another embodiment, a computer-implemented method for determining developed code scores of an application is disclosed. The method may include: receiving, by a processor, one or more first score tags of one or more first blocks of developed code from a user through a computing device; identifying, by the processor, patterns in the developed code based on the received first score tags; applying, by the processor, the identified patterns to one or more second blocks of the developed code; determining, by the processor, a second tag for each second block of the one or more second blocks of the developed code based on the applied patterns; creating, by the processor, a structured shell of the developed code based on the received first score tags and the determined second score tags; and determining, by the processor, an aggregate score for the application based on the received first score tags and the determined second score tags of each first and second block of developed code.

In yet another embodiment, a computer-implemented method for determining developed code scores of an application is disclosed. The method may include: receiving, by a processor, a shell of developed code for an application including one or more first score tags of one or more first blocks of developed code and one or more second score tags of one or more second blocks of developed code from a first user through a first computing device; storing, by the processor, the received shell of developed code in a database; receiving, by the processor, one or more third score tags of the one or more first blocks of developed code from a second user through a second computing device; identifying, by the processor, patterns in the developed code based on the received one or more third score tags; applying, by the processor, the identified patterns to the one or more second blocks of the developed code; determining, by the processor, one or more fourth score tags for the one or more second blocks of the developed code based on the applied patterns; and updating, by the processor, the shell of developed code based on the received one or more third score tags and the determined one or more fourth score tags.

In yet another embodiment, a computer system for determining developed code scores of an application is disclosed. The computer system may include: a memory having processor-readable instructions stored therein. The computer system may also include at least one processor configured to access the memory and execute the processor-readable instructions, which when executed by the processor configures the processor to perform a plurality of functions. The functions may include functions for: receiving a shell of developed code for an application including one or more first score tags of one or more first blocks of developed code and one or more second score tags of one or more second blocks of developed code from a first user through a first computing device; storing the received shell of developed code in a database; receiving one or more third score tags of the one or more first blocks of developed code from a second user through a second computing device; identifying patterns in the developed code based on the received one or more third score tags; applying the identified patterns to the one or more second blocks of the developed code; determining one or more fourth score tags for the one or more second blocks of the developed code based on the applied patterns; and updating the shell of developed code based on the received one or more third score tags and the determined one or more fourth score tags.

In yet another embodiment, a computer-implemented method for determining developed code scores of an application is disclosed. The method may include: receiving, by a processor, a shell of developed code for an application including one or more first score tags of one or more first blocks of developed code and one or more second score tags of one or more second blocks of developed code from a first user through a first computing device; storing, by the processor, the received shell of developed code in a database, the database including a library of shells of developed code for the application; receiving, by the processor, one or more third score tags of the one or more first blocks of developed code from a second user through a second computing device; replacing, by the processor, some or all of the one or more first score tags with the one or more third score tags; identifying, by the processor, patterns in the developed code based on the received one or more third score tags; applying, by the processor, the identified patterns to the one or more second blocks of the developed code, the one or more second blocks of developed code and the one or more first blocks of developed code corresponding to a similar function of the application; determining, by the processor, one or more fourth score tags for the one or more second blocks of the developed code based on the applied patterns; and updating, by the processor, the shell of developed code based on the received one or more third score tags and the determined one or more fourth score tags.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to application reliability, resiliency, performance, security, and, more particularly, to systems and methods for determining developed code scores of an application.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "computer system" generally encompasses any device or combination of devices, each device having at least one processor that executes instructions from a memory medium. Additionally, a computer system may be included as a part of another computer system.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In general, the present disclosure provides for systems and methods for determining developed code scores of an application. As used herein, "developed code scores," "code scores," or "scores" are qualitative or quantitative measurements or attributes of developed code, or portions thereof, of an application that define, describe, conceptualize, or otherwise express the ability of the developed code, or a portion thereof, to provide a service or process (e.g., reliability, resiliency, performance, security, etc.), and are derived or otherwise generated by pre-defined metrics. Embodiments of the present disclosure provide for a machine learning system to categorize code of an application based on language, version, and function. For example, a human operator may tag the code as a trainer function for a k-means machine learning algorithm to derive a score for various functions of the code. This may allow similar functions in the same code set to be compared and standardized for "best" functions as part of implementing best practices in an enterprise or across an industry. For example, the scores may correspond to various metrics related to reliability, resiliency, performance, security, or other metrics of an application.

The machine learning system may take into account user-defined principles (e.g., defined by an engineer), as well as multiple facets of an application (e.g., static, compositional, operational, etc.) and may compare them with defined standards (e.g., service level indicators). The machine learning system may receive source code of the application and may receive tags of the code from a user (e.g., a developer engineer) in order to train the machine learning system. For example, the tags may score the code as "good," "bad," "questionably good," and/or "questionably bad." However, the tags may score the code according to any metric as desired (e.g., numerical, verbal, alphanumerical, or combinations thereof). Thus, a skeleton (e.g., a shell) of the code with the tags may be created. The machine learning system may apply the skeleton against future code blocks and/or entire applications. As used herein, a "skeleton" is a structured shell of a programming language that contains enough structure for the machine learning system to recognize "good" and "bad" code patterns to various levels of degree. Thus, the skeleton may provide a template for the machine learning system.

In some embodiments, a library of skeletons may be created. The library may organize the skeletons by language, version, and/or function. Users may revise a skeleton of the library with new score tags to train the machine learning system, and thus the skeleton may be updated. The new score tags may include higher and/or more detailed scores. Thus, the skeleton may include a gradient or spectrum of different scores. Embodiments may provide for users to mark findings with "ignore (with reason)" and/or false positive. Thus, the users may refine the skeleton as needed. In determining developed code scores, the machine learning system may take into account consumption patterns, such as internal facing, external facing, 24/7 consumption or only business hours, domestic or international, or any other type of patterns.

Further, metrics, such as service level indicators, may be taken into account in determining developed code scores. The metrics may include mandatory indicators and optional indicators. The mandatory indicators may include, for example, service up time, response times, server/client error ratios, incidents in a 6-month time period (e.g., including incident type, incident severity, incident cause type), time required for traffic switches, and/or recovery time objective (RTO) targets. Service up time is the amount of time a service (e.g., of an application) has been running without interruption. Response time is the amount of time taken for responding to an incident. Incidents include a disruption to technology systems requiring automated or manual intervention to return to normal function for the system. Incidents may be defined by an enterprise for a particular application and/or service. Recovery time objective targets are the targets for restoring system function when an incident has been detected in order to avoid escalation or worsening outcome. The optional indicators may include for example, number of releases per time period (e.g., major, minor, maintenance), time taken to deploy service, and/or service redundancy level (e.g., single region, active/passive, A/A, etc.). It is understood that the metrics input may be configurable to include any other indicators.

Thus, the machine learning system may output an overall developed code metric or score. The developed code score may then be used to consistently compare reliability, resiliency, performance, security, or any other metrics across applications. The machine learning system may also output scores accounting for external factors (e.g., cyber attacks, etc.), tiers based on usage requirements (e.g., low, medium, high, very high), and/or key areas (e.g., blocks of code) of improvement in the application.

Further, the trained machine learning system may result in improved speed or accuracy in determining objective scores or metrics of various services or process of an application. For example, the generation or filtering of training data (e.g., input scores) may result in models that require fewer computing resources or increased processing speed. The use of an objective decision making process based on objective metrics or indicators of the trained machine learning system to generate and output objective scores may reduce or eliminate the subjectivity of current metrics. Thus, the embodiments of the present disclosure may provide for an improvement to technology areas, such as computing processing, as well as improvements to providing analysis and/or other metrics of developed code of applications across an enterprise system.

The system of the present disclosure may provide for a consistent and comparable way to evaluate reliability, resiliency, performance, security, or other metrics of an application. For example, the machine learning system may use pattern recognition and other defined metrics and standards (e.g., service level indicators) to output objective scores agnostic of the programming language or type of application. The scores may be iteratively improved as new standards and algorithms are defined.

Figure 1:
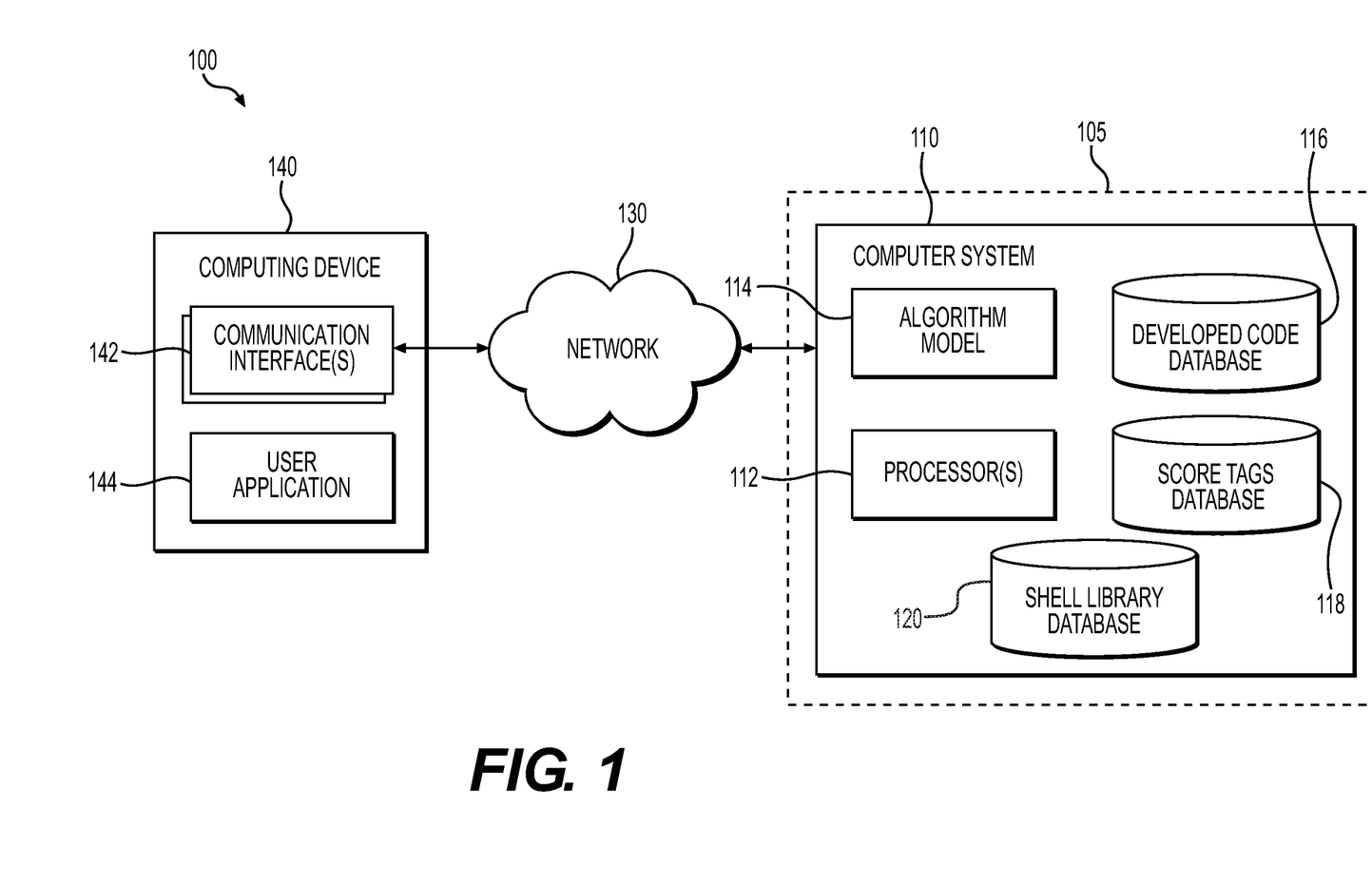
FIG. 1 depicts an exemplary system architecture for determining developed code scores of an application, according to one or more embodiments.

Referring now to the appended drawings, FIG. 1 is a diagram depicting an exemplary system environment 100 for determining developed code scores of an application, according to embodiments of the present disclosure. As shown in FIG. 1, system environment 100 may include a computer system 110, a network 130, and a user computing device (or a device associated with a user) 140. Computer system 110 and user computing device 140 may be in communication with each other via network 130, as detailed below.

Figure 5:
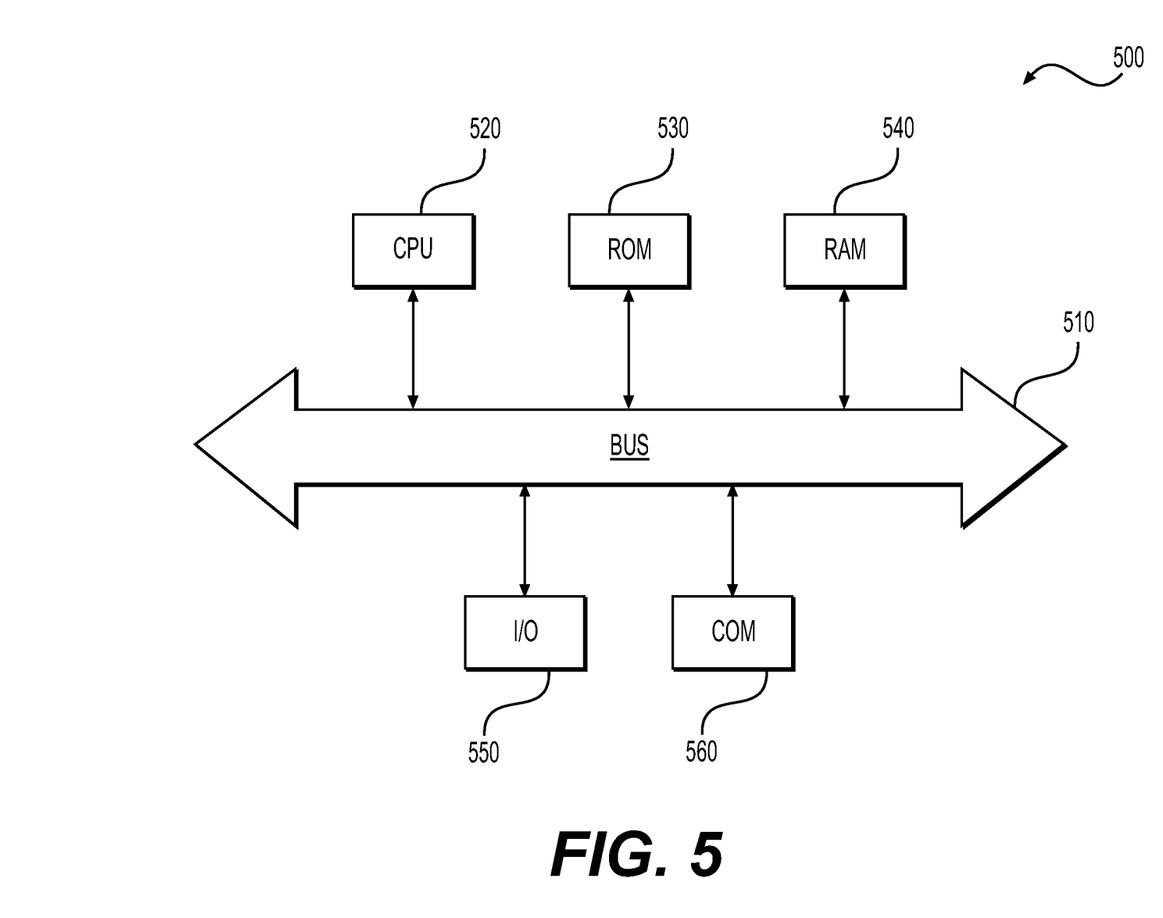
FIG. 5 depicts an example system that may execute techniques presented herein.

The computer system 110 may include computing systems, such as system 500 described with respect to FIG. 5. As such, computer system 110 may include one or more processors and a memory for storing and executing applications or software modules of system environment 100. For example, computer system 110 may include one or more software modules to communicate with user devices and/or other computing devices through network 130, such as the Internet. Further, the one or more processors may be configured to access the memory and execute processor-readable instructions, which when executed by the processor configures the processor to perform a plurality of functions of the system environment 100. For example, the one or more processors may include one or more processors 112 for determining developed code scores of an application, as detailed further below.

Computer system 110 may further include one or more modules, models, engines, or databases, including an algorithm model 114, a developed code database 116, a score tags database 118, and a shell library database 120, which may be software components stored in/by the computer system 114 (e.g., stored on the memory). The computer system 110 may be configured to utilize the one or more modules, models, engines, or databases when performing various methods described in this disclosure. In some embodiments, computer system 110 may have a cloud computing platform with scalable resources for computation and/or data storage, and may run one or more applications on the cloud computing platform to perform various computer-implemented methods described in this disclosure. In some embodiments, some of the modules, models, engines, or databases may be combined to form fewer modules, models, engines, or databases. In some embodiments, some of the modules, models, engines, or databases may be separated into separate, more numerous modules, models, engines, or databases. In some embodiments, some of the modules, models, engines, or databases may be removed while others may be added.

Computer system 110 may be configured to receive data from other components (e.g., user computing device 140) of system environment 100 via network 130. Computer system 110 may further be configured to utilize the received data by inputting the received data into the algorithm model 114 to produce a result (e.g., developed code scores). Information indicating the result may be transmitted to user computing device 140 over network 130. In some embodiments, the computer system 110 may be referred to as a server system that provides a service including providing the information indicating the received data and/or the result to the user computing device 140. Computer system 110 may be part of an entity 105, which may include any type of company, organization, or institution that implements one or more applications. In some examples, entity 105 may be a financial services provider.

Computer system 110 may implement one or more applications of entity 105. The one or more applications may each include developed code, developed by, for example, a software engineer, such as a software developer engineer. Each application may be implemented across multi-tier, multiple technology infrastructures. Each application, and each block of the developed code of each application, may include a level of resilience, reliability, performance, or security. As used herein, "resilience" is the ability of an application to react to problems in one of its components and still provide the best possible service. Service level agreements (SLAs), service level objectives (SLOs), and service level indicators (SLIs) may impact the running of business processes of the applications. For example, SLOs may need to be higher than SLA limits for a business to reliably fulfill its legal contracts and commitments based on the SLA limits. As detailed below with respect to FIGS. 2-4, algorithm model 114 (via processor 112) may determine a developed code score of an application based on various metrics for resilience, reliability, performance, security, or other metrics.

The algorithm model 114 may be a plurality of algorithm models. The algorithm model 114 may include a trained machine learning algorithm. The trained machine learning algorithm may include a regression-based model that accepts developed code and score tags of the developed code as input data. The trained machine learning algorithm may be part of the algorithm model 114. The trained machine learning algorithm may be of any suitable form, and may include, for example, a neural network. A neural network may be software representing human neural system (e.g., cognitive system). A neural network may include a series of layers termed "neurons" or "nodes." A neural network may comprise an input layer, to which data is presented; one or more internal layers; and an output layer. The number of neurons in each layer may be related to the complexity of a problem to be solved. Input neurons may receive data being presented and then transmit the data to the first internal layer through connections' weight. A neural network may include a convolutional neural network, a deep neural network, or a recurrent neural network. The machine learning algorithm may be trained by supervised, unsupervised, or semi-supervised learning using training sets comprising data of types similar to the type of data used as the model input. For example, unsupervised approaches may include K-means clustering. K-Nearest Neighbors may also be used, which may be supervised or unsupervised. Combinations of K-Nearest Neighbors and an unsupervised cluster technique may also be used. For example, the training set used to train the model may include any combination of the following: developed code and score tags of the developed code, and predetermined metrics, such as service level indicators, as detailed below.

Developed code database 116 may include one or more databases for storing developed code of the one or more applications for use by algorithm model 114 (e.g., via processor 112). For example, processor 112 may receive developed code from user computing device 140 and store the received developed code in database 116. Algorithm model 114 may receive the developed code from database 116 or directly from user computing device 140, as detailed below. The developed code may include blocks of code, such as first blocks of code and second blocks of code. The first blocks of code and second blocks of code may correspond to similar functions of the application, as detailed below.

Score tags database 118 may include one or more databases for storing score tags for use by algorithm model 114 (e.g., via processor 112). For example, processor 112 may receive first score tags from a first user via a first computing device 140, store the received score tags in database 118, and algorithm model 114 may access database 118 and use the received score tags, as detailed below. Algorithm model 114 may also determine second score tags and store the determined second score tags in database 118. Processor 112 may also receive third score tags from a second user via a second computing device 140, store the received score tags in database 118, and algorithm model 114 may access database 118 and use the received third score tags, as detailed below. Algorithm model 114 may also determine fourth score tags and store the determined fourth score tags in database 118. It is understood that the first user and second user may include the same user and the first computing device 140 and the second computing device may include the same computing device 140. Further, processor 112 may receive any number of score tags from any number of users via any number of computing devices 140, as deemed desirable or necessary.

Shell library database 120 may include one or more databases for storing structured shells of developed code with score tags received from computing device 140 and/or determined by algorithm model 114, as detailed below. Each generated shell of developed code may be stored in database 120 for generating a library of shells of developed code. One or more second users may access the library of shells of developed code via computing device 140 and may update a shell with one or more third score tags, as detailed below. The shells in shell library database 120 may be organized by programming language, version of the application, or function type corresponding to the first and second blocks of code. It is understood that the shells may be organized by any indicator, as deemed desirable or necessary.

Network 130 may be any suitable network or combination of networks and may support any appropriate protocol suitable for communication of data to and from the computer system 110 and between various other components in the system environment 100 (e.g., user computing device 140). Network 130 may include a public network (e.g., the Internet), a private network (e.g., a network within an organization), or a combination of public and/or private networks. Network 130 may be configured to provide communication between various components depicted in FIG. 1. Network 130 may comprise one or more networks that connect devices and/or components in the network layout to allow communication between the devices and/or components. For example, the network may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 130 may be implemented using cell and/or pager networks, satellite, licensed radio, or a combination of licensed and unlicensed radio.

Computing device 140 may be in communication with computer system 110 via network 130. Computing device 140 may be a computer system that is operated by a user, such as a mobile device (e.g., smartphone, tablet, pager, personal digital assistant (PDA)), a computer (e.g., laptop computer, desktop computer, server), or a wearable device (e.g., smart watch). Computing device 140 can also include any other media content player, for example, a set-top box, a television set, a video game system, or any electronic device capable of providing or rendering data. Computing device 140 may optionally be portable and/or may be handheld. Computing device 140 may include a memory, one or more processors, communication interfaces, input devices, and output devices, as detailed further below with reference to FIG. 5. It is understood that computing device 140 may include one or more computing devices accessed by one or more users. For example, a first user may use a first computing device 140 and a second user may use a second computing device 140.

User computing device 140 may include one or more communication interfaces 142. Communication interface 142 may include one or more cellular radios, Bluetooth, WiFi, near-field communication radios, or other appropriate communication devices for transmitting and receiving information. As can be seen in FIG. 1, communication interface 142 facilitates communication between user computing device 140 and network 130. Multiple communication interfaces 142 may be included in user computing device 140 for providing multiple forms of communication between user computing device 140 and computer system 110 via network 130. For example, communication may be achieved with network 130 through wireless communication (e.g., WiFi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

User computing device 140 may operate a client program, also referred to as a user application 144 or third-party application, used to communicate with the computer system 110. This user application 144 may be used to provide information (e.g., developed code, score tags, and/or predetermined metrics) to the computer system 110 and to receive information (e.g., scores) from the computer system 110. User application 144 may include a web-based application accessed through a web browser of user computing device 140 via network 130. In some examples, the user application 144 may be a mobile application or other application that is run on computing device 140.

Figure 2:
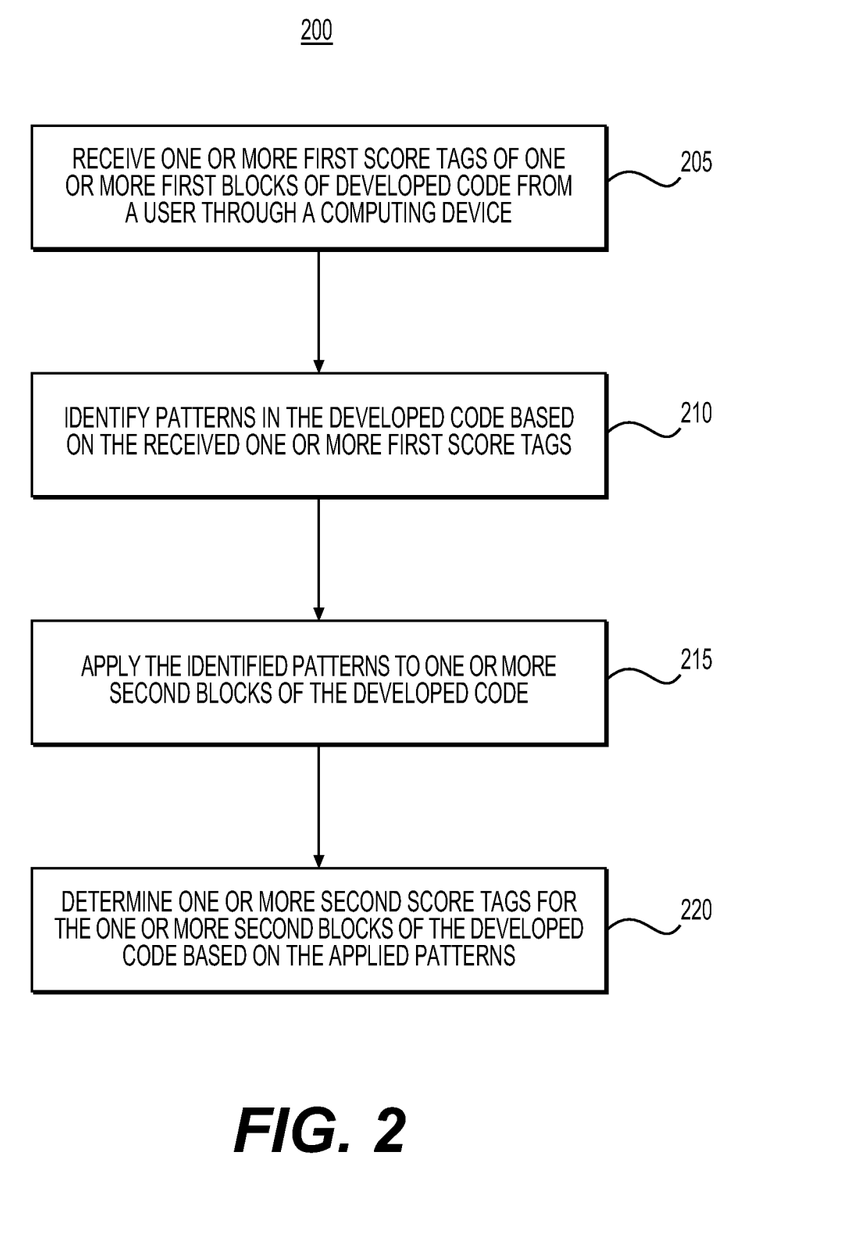
FIG. 2 depicts a flowchart of an exemplary method for determining developed code scores of an application.

FIG. 2 depicts a flowchart of an exemplary method 200 for determining developed code scores of an application, according to one embodiment. In an initial step 205, algorithm model 114 (e.g., via processor 112) may receive one or more first score tags of one or more first blocks of developed code from a user through computing device 140. For example, algorithm model 114 may receive the developed code for an application from database 116 or directly from the user through computing device 140 via network 130. The one or more first blocks of developed code may correspond to a function that is performed when the code is executed. The user may tag one or more of the first blocks of developed code with scores (e.g., the score tags) based on predetermined metrics. For example, the scores may indicate whether each tagged block represents good, bad, questionably good, and/or questionably bad code for a given function. The score tags may include any metric and/or scoring system as defined by the user. For example, the score tags may include a ranking from zero to one-hundred. The one or more first score tags may include tags of the one or more first blocks of code for training algorithm model 114, as detailed above. Thus, the one or more first score tags may provide a baseline score for a code for a particular function.

In the following description, pseudocode is provided for a representational state transfer (REST) call that may be coded in any language known in the art. Algorithm model 114 may receive developed code for the REST call. For example, the developed code (e.g., pseudocode for exemplary purposes) for the REST call may include the following:

a. Build Request
  b. Sanitize/Encode Request
  c. Submit Request Over HTTPS using SSL/TLS
    i. Check Response Status Code for Exceptions
    ii. Retry Request
    iii. Handle Exception Gracefully
  d. Sanitize Response for Malicious Data
  e. Process Response After algorithm model 114 has received the developed code, the user may tag the REST call code (e.g., the block of developed code) with a score tag. In this example, the REST call code represents a "good" REST call (e.g., good resilience), so the user may tag the REST call code as "good," or as some other type of quantitative or qualitative score (e.g., "100"). The user may repeat this process to tag other blocks (e.g., first blocks) of the developed code. As used herein, the "first blocks" of developed code are any blocks of the developed code in which the user tags with score tags. Accordingly, the algorithm model 114 (e.g., via processor 112) may receive the one or more first score tags of the one or more first blocks of developed code from the user through computing device 140.

The predetermined metrics may include, for example, service level indicators (SLIs), which are used to indicate a level of resilience, reliability, performance, or security for the application. The metrics may include, for example, service up time, response times, server/client error ratios, incidents in a 6-month time period (e.g., incident types, incident severity, incident cause type), time required for traffic switches, recovery point objective (RPO) targets, and/or recovery time objective (RTO) targets. It is understood that the metrics may include any type of metric for determining scores related to resilience, reliability, performance, security or other indicators of an application.

In step 210, algorithm model 114 (e.g., via processor 112) may identify patterns in the developed code based on the received one or more first score tags. For example, algorithm model 114 may identify patterns of what types of blocks of code for the particular function should look like based on the score tags. In the exemplary pseudocode for the REST call, the algorithm model 114 may identify the patterns in the code for the REST call and recognize that the code is "good" based on the tag received from the user through the computing device 140.

In step 215, algorithm model 114 (e.g., via processor 112) may apply the identified patterns to one or more second blocks of the developed code. For example, the algorithm model 114 may compare the identified patterns of the first blocks with the second blocks of developed code for the particular function. In the exemplary pseudocode for the REST call, the algorithm model 114 may compare the "good" code for the REST call to the second blocks of code that include REST calls. Thus, algorithm model 114 may compare the one or more first blocks of code to the one or more second blocks of code for the particular function using the first score tags.

In step 220, algorithm model 114 (e.g., via processor 112) may determine one or more second score tags for the one or more second blocks of the developed code based on the applied patterns. For example, based on the comparison, algorithm model 114 may determine score tags (e.g., the one or more second score tags) for the second blocks of code for the particular function. In the REST call example, algorithm model 114 may compare the "good" REST call code to other REST call codes to determine if the other REST call codes match (e.g., are the same or similar to, or satisfy a similarity threshold of) the "good" REST call code. If the other REST call code matches the "good" REST call code, algorithm model 114 may score the other REST call code as "good." If the other REST call code does not match, algorithm model 114 may score the other REST call code as "bad" or some other scoring metric. In some embodiments, the one or more second score tags may be based on a function of the difference between the first blocks of code and the second blocks of code. For example, if the "good" REST call code is scored as a "99," algorithm model 114 may score the other REST call code between 0-100 (or by another metric) based on the difference between the "good" REST call code and the other REST call code.

Processor 112 may then cause display of the one or more second score tags for the one or more second blocks of the developed code. For example, processor 112 may transmit data to render a display of the one or more second score tags on computing device 140 through network 130.

The first and second score tags may include a spectrum of scores. For example, the spectrum of scores may include a range of scores (e.g., 0-100, or any other variables or values). Algorithm model 114 may also determine an aggregate score for the application for a particular indicator (e.g., resilience, reliability, performance, security, etc.) based on the received first score tags and the determined second score tags of each block of developed code. The first and second score tags may also include tiers of scores. For example, the tiers may include low (e.g., 0-33), medium (e.g., 34-67), and high (e.g., 68-100). Low scores may be indicative of key areas of improvement in the application. For example, a REST call code block that is determined to be low resiliency may indicate that code block may need improvement to increase the resilience.

Processor 112 may also generate a structured shell of the developed code based on the received first score tags and the determined score tags. Algorithm model 114 may then use the structured shell to determine score tags of other blocks of code for the functions associated with the blocks of code in the structured shell. In some embodiments, the structured shell may be stored in a database (e.g., score tags database 118). The database may include various structured shells each corresponding to a programming language, a version of an application, and/or associated with discrete functions.

Figure 3:
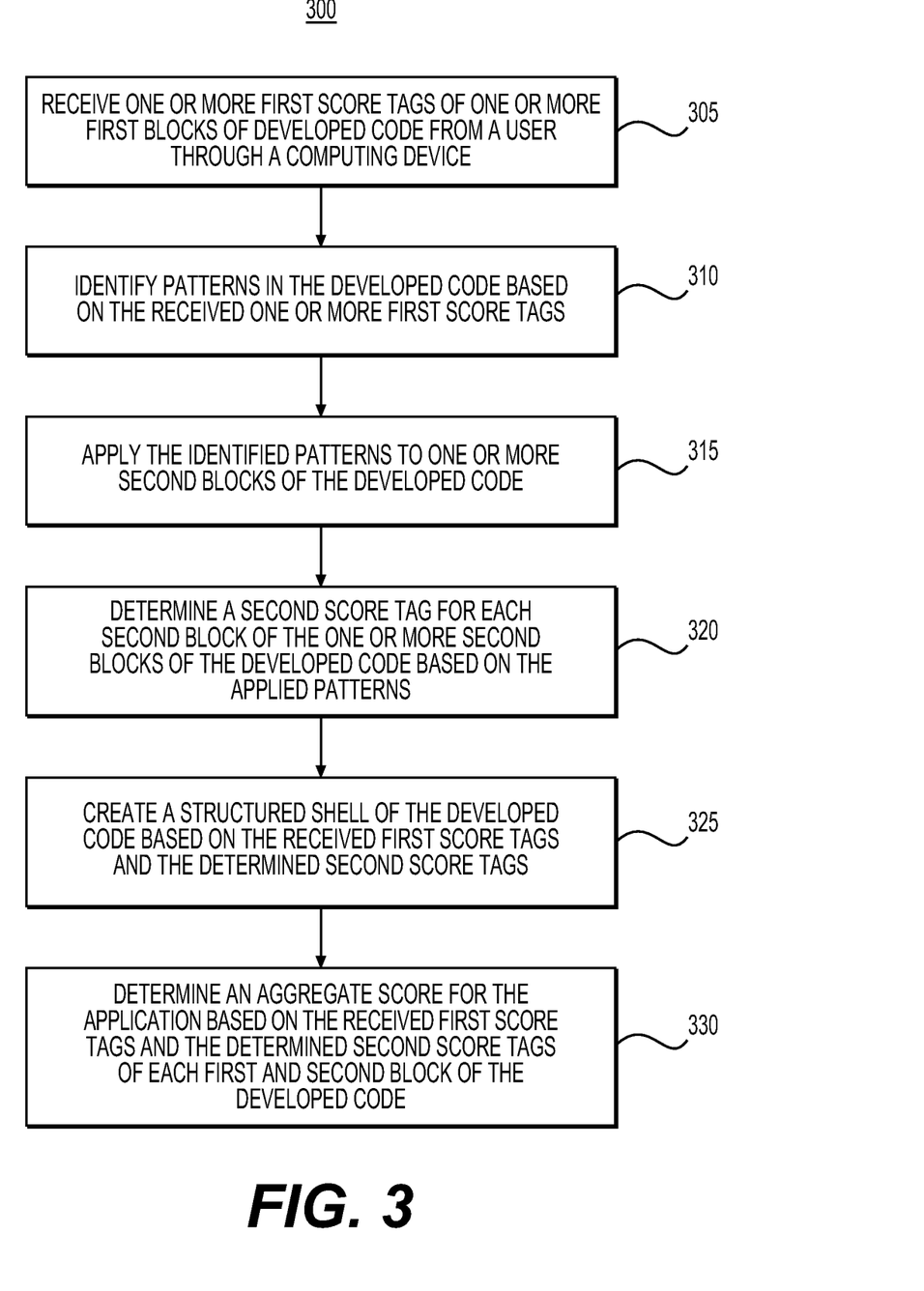
FIG. 3 depicts a flowchart of another exemplary method for determining developed code scores of an application.

FIG. 3 depicts a flowchart of an exemplary method 300 for determining developed code scores of an application, according to another embodiment. In an initial step 305, processor 112 may receive one or more first score tags of one or more first blocks of developed code from a user through computing device 140.

In step 310, processor 112 may identify patterns in the developed code based on the received first score tags.

In step 315, processor 112 may apply the identified patterns to one or more second blocks of the developed code.

In step 320, processor 112 may determine a second score tag for each second block of the one or more second blocks of the developed code based on the applied patterns.

In step 325, processor 112 may create a structured shell of the developed code based on the received first score tags and the determined second score tags.

In step 330, processor 112 may determine an aggregate score for the application based on the received first score tags and the determined second score tags of each first and second block of developed code.

Figure 4:
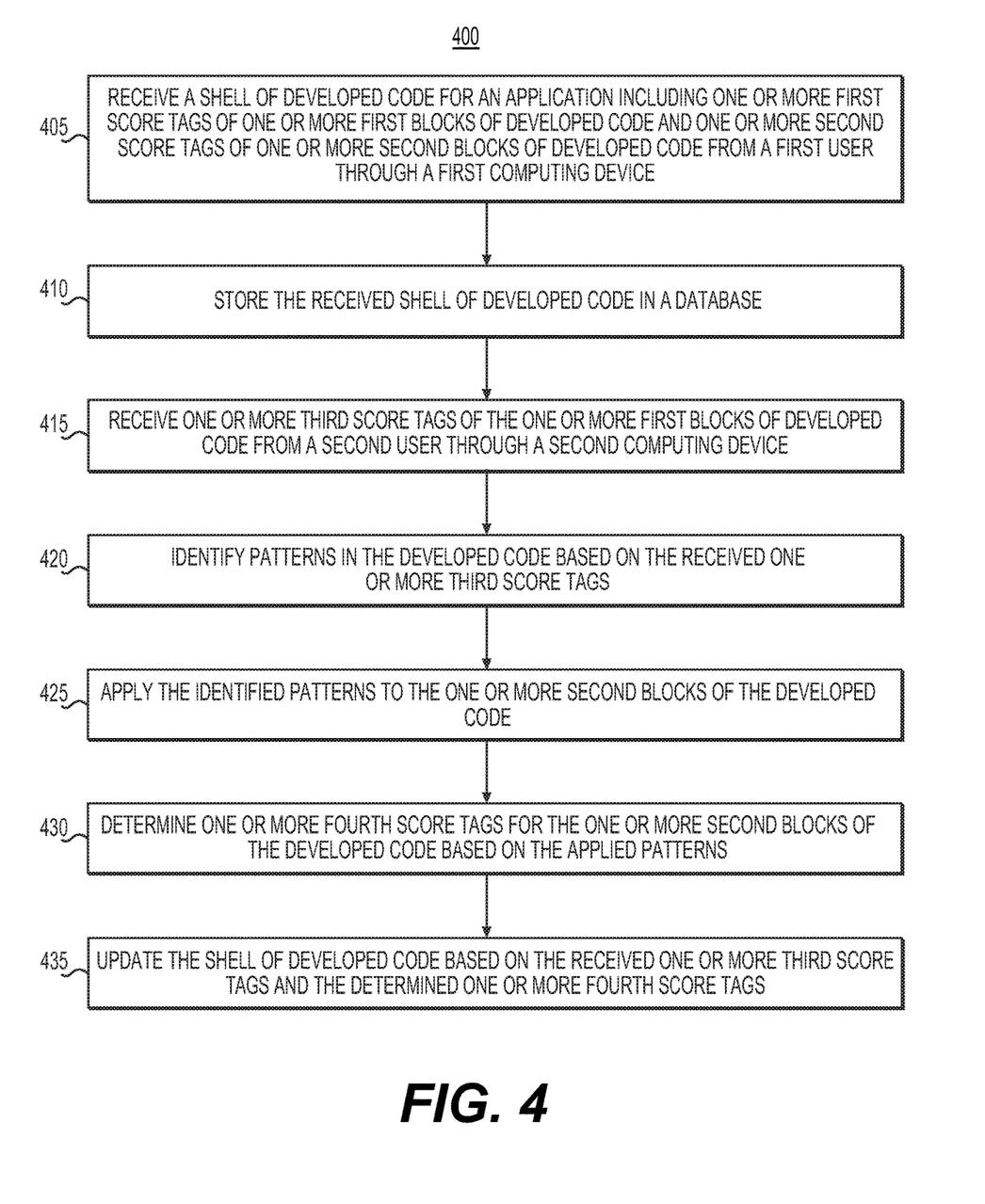
FIG. 4 depicts a flowchart of another exemplary method for determining developed code scores of an application.

FIG. 4 depicts a flowchart of an exemplary method 400 for determining developed code score tags of an application, according to another embodiment. In an initial step 405, processor 112 may receive a shell of developed code for an application from a first user through a first computing device 140. As detailed above, the shell may include one or more first score tags of one or more first blocks of developed code and one or more second score tags of one or more second blocks of developed code. The first and second blocks of code may correspond to a similar function of the application. For example the first and second blocks of code may correspond to a REST function, as detailed in the example above.

In step 410, processor 112 may store the received shell of developed code in a database. For example, processor 112 may store the received shell of developed code in shell library database 120.

In step 415, processor 112 may receive one or more third score tags of the one or more first blocks of developed code from a second user through a second computing device. Processor 112 may replace some or all of the one or more first score tags with the one or more third score tags.

In step 420, processor 112 may identify patterns in the developed code based on the received one or more third score tags. For example, processor 112 may use the received one or more third score tags to train algorithm model 114.

In step 425, processor 112 may apply the identified patterns to the one or more second blocks of the developed code.

In step 430, processor 112 may determine one or more fourth score tags for the one or more second blocks of developed code based on the applied patterns. For example, processor 112 may determine the one or more fourth score tags for the one or more second blocks of developed code based on the trained machine learning algorithm.

In step 435, processor 112 may update the shell of developed code based on the received one or more third score tags and the determined one or more fourth score tags.

The first, second, third, and fourth score tags may include a spectrum of scores. For example, the first score tags may include a first score, the second score tags may include a second score, the third score tags may include a third score, and the fourth score tags may include a fourth score. In some embodiments, the first and third score tags may include a description of a score of the first blocks of developed and the second and fourth score tags may include a description of a score of the second blocks of developed code. The third score tags may include a more detailed description of the first blocks of developed code than the first score tags. For example, the first score tags may include less detailed descriptor such as "good code" and the third score tags can include more detailed descriptor such as "this tag is our best practice for deploying encryption standards at 256 bit AES." In some embodiments, the tags may include hashtags, such as, for example, #256AESgood start" and "#256AESgood end." Thus, users can re-train the algorithm model 114 with more detailed score tags that includes a better (e.g., more resilient or reliable, or provides better performance or security) block of code for a particular function of the application.

FIG. 5 depicts an example system 500 that may execute techniques presented herein. FIG. 5 is a simplified functional block diagram of a computer that may be configured to execute techniques described herein, according to exemplary embodiments of the present disclosure. Specifically, the computer (or "platform" as it may not be a single physical computer infrastructure) may include a data communication interface 560 for packet data communication. The platform also may include a central processing unit ("CPU") 520, in the form of one or more processors, for executing program instructions. The platform may include an internal communication bus 510, and the platform also may include a program storage and/or a data storage for various data files to be processed and/or communicated by the platform such as ROM 530 and RAM 540, although the system 500 may receive programming and data via network communications. The system 500 also may include input and output ports 550 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method implemented on a computer for determining developed code scores of an application, the method including:
   receiving, by a processor of the computer, for use as training data, one or more first blocks of developed code for an application that correspond to a function of the application and one or more user-defined score tags for the one or more first blocks that indicate a quality of the one or more first blocks for the function, wherein the training data is provided as input to a machine learning system to train the machine learning system to identify a shell of the developed code for the function;
   receiving, by the processor, one or more new user-defined score tags for the one or more first blocks, wherein the one or more new user-defined score tags are provided as input to retrain the machine learning system to identify an updated shell of the developed code for the function;
   receiving, by the processor, one or more second blocks of the developed code for the application that correspond to the function;

providing, by the processor, the one or more second blocks as input to the trained machine learning system, wherein the trained machine learning system applies the updated shell to the one or more second blocks to predict score tags for the one or more second blocks that indicate a quality of the one or more second blocks for the function; and receiving, by the processor, the predicted score tags as output of the trained machine learning system.

2. The method of claim 1, wherein the one or more user-defined score tags and the one or more new user-defined score tags include a spectrum of scores.

3. The method of claim 1, wherein the trained machine learning system is further configured to predict an aggregate score for the application based on the predicted score tags.

4. The method of claim 1, wherein the one or more user-defined score tags and the predicted score tags include tiers of scores.

5. The method of claim 4, wherein the tiers include low, medium, and high.

6. The method of claim 5,
wherein low scores are indicative of key areas for improvement in the application.

7. The method of claim 1, wherein the one or more user-defined score tags and the predicted score tags are based on service level indicators associated with the application.

8. The method of claim 7, wherein the service level indicators include at least one of: service uptime, response times, server/client error ratios, incidents in a predetermined time period, time required for traffic switches, or recovery time objective (RTO) targets.

9. The method of claim 1, wherein, to identify the shell during training, the machine learning system identifies patterns in the one or more first blocks of the developed code and associates the patterns with the one or more user-defined score tags for the one or more first blocks.

10. The method of claim 1, wherein the quality of the one or more first blocks indicated by the one or more user-defined score tags and the quality of the one or more second blocks indicated by the predicted score tags are each associated with one or more service attributes of the developed code, including at least one of reliability, resiliency, performance, or security.

11. The method of claim 1, wherein the training data further includes consumption patterns and service level indicators for the application.

12. A computer system for determining developed code scores of an application, comprising:
at least one memory having processor-readable instructions stored therein; and
at least one processor configured to access the at least one memory and execute the processor-readable instructions, which when executed by the at least one processor configures the at least one processor to perform a plurality of functions, including functions for:
receiving, for use as training data, one or more first blocks of developed code for an application that correspond to a function of the application and one or more user-defined score tags for the one or more first blocks that indicate a quality of the one or more first blocks for the function, wherein the training data is provided as input to a machine learning system to train the machine learning system to identify a shell of the developed code for the function;
receiving one or more new user-defined score tags for the one or more first blocks, wherein the one or more new user-defined score tags are provided as input to retrain the machine learning system to identify an updated shell of the developed code for the function;
receiving one or more second blocks of the developed code for the application that correspond to the function;
providing the one or more second blocks as input to the trained machine learning system, wherein the trained machine learning system applies the updated shell to the one or more second blocks to predict score tags for the one or more second blocks that indicate a quality of the one or more second blocks for the function; and
receiving the predicted score tags as output of the trained machine learning system.

13. The computer system of claim 12, wherein the one or more user-defined score tags and the one or more new user-defined score tags include a spectrum of scores.

14. The computer system of claim 12, wherein the trained machine learning system is further configured to predict an aggregate score for the application based on the predicted score tags.

15. The computer system of claim 12, wherein the one or more user-defined score tags and the predicted score tags include tiers of scores.

16. The computer system of claim 15, wherein the tiers include low, medium, and high.

17. The computer system of claim 16, wherein low scores are indicative of key areas for improvement in the application.

18. The computer system of claim 12, wherein the one or more user-defined score tags and the predicted score tags are based on service level indicators associated with the application.

19. A method implemented by a computer for determining developed code scores of an application, the method including:
receiving, by a processor of the computer, for use as training data, one or more first blocks of developed code for an application that correspond to a function of the application and one or more user-defined score tags for the one or more first blocks, wherein the training data is provided as input to a machine learning system to train the machine learning system to identify a shell of the developed code for the function based on patterns identified in the one or more first blocks and the one or more user-defined score tags associated with the patterns;
receiving, by the processor, one or more new user-defined score tags for the one or more first blocks, wherein the one or more new user-defined score tags are provided as input to retrain the machine learning system to identify an updated shell of the developed code for the function;
receiving, by the processor, one or more second blocks of the developed code for the application that correspond to the function;
providing, by the processor, the one or more second blocks as input to the trained machine learning system, wherein the trained machine learning system identifies patterns in the one or more second blocks and applies the updated shell to compare the patterns in the one or more first blocks to the patterns in the one or more second blocks to predict score tags for the one or more second blocks that indicate a quality of the one or more second blocks for the function; and receiving, by the processor, the predicted score tags as output of the trained machine learning system.

20. The method of claim 9, wherein, to determine the predicted score tags for the one or more second blocks, the trained machine learning system is configured to:
   identify patterns in the one or more second blocks;
   apply the updated shell to the one or more second blocks to compare the patterns in the one or more second blocks to the patterns in the one or more first blocks; and
   determine the predicted score tags as a function of differences between the one or more second blocks and one or more first blocks based on the comparison.

\* \* \* \* \*